C. BOZILE.
ENSILAGE CUTTER.
APPLICATION FILED AUG. 5, 1912.
1,084,249.
Patented Jan. 13, 1914.
3 SHEETS—SHEET 2.
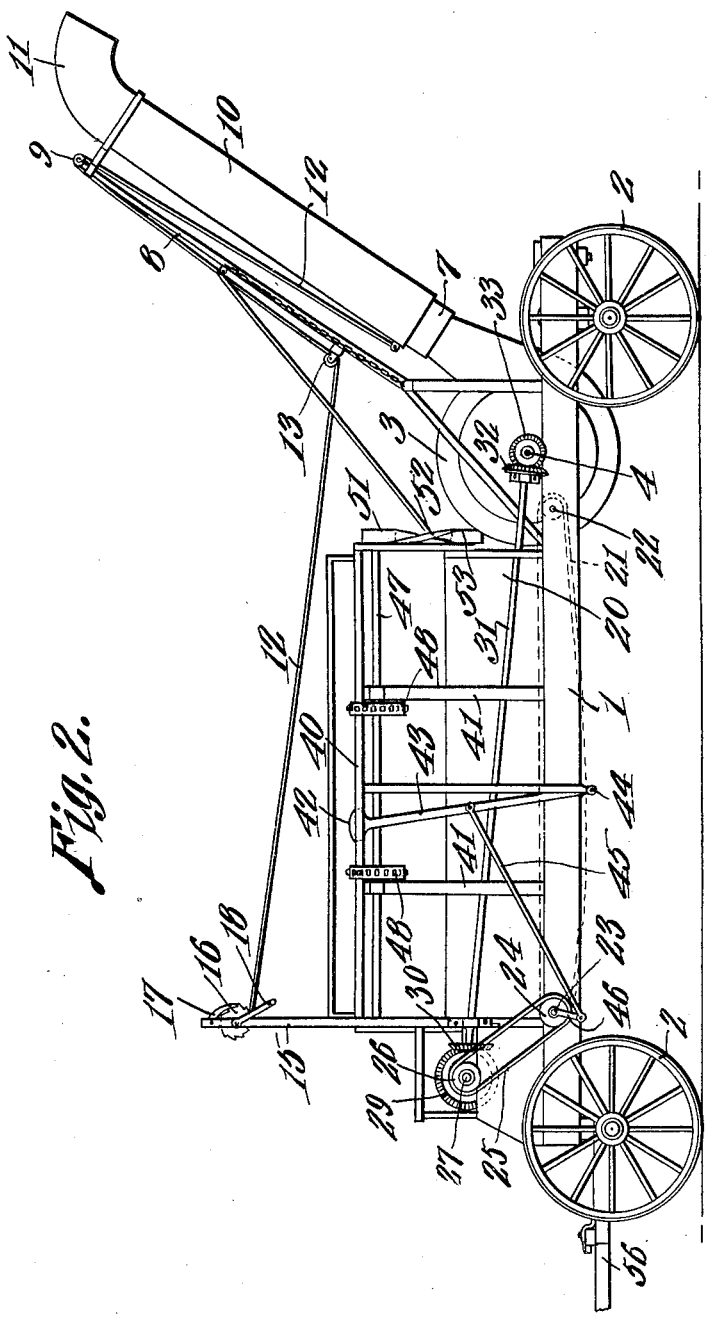
Witnesses
Charles Bozile, Inventor
by C. A. Snow & Co.
Attorneys C. BOZILE.
ENSILAGE CUTTER.
APPLICATION FILED AUG. 5, 1912.
1,084,249.
Patented Jan. 13, 1914.
3 SHEETS—SHEET 3.
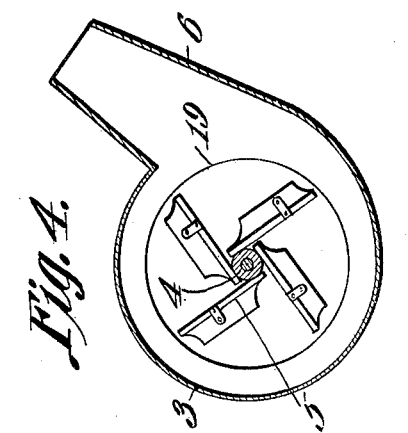
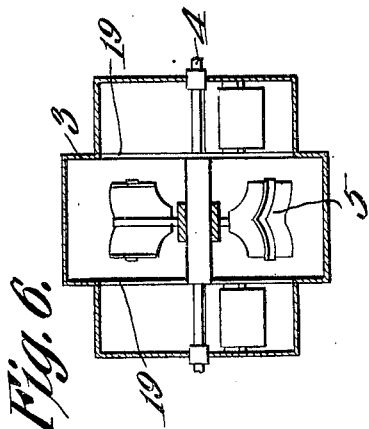
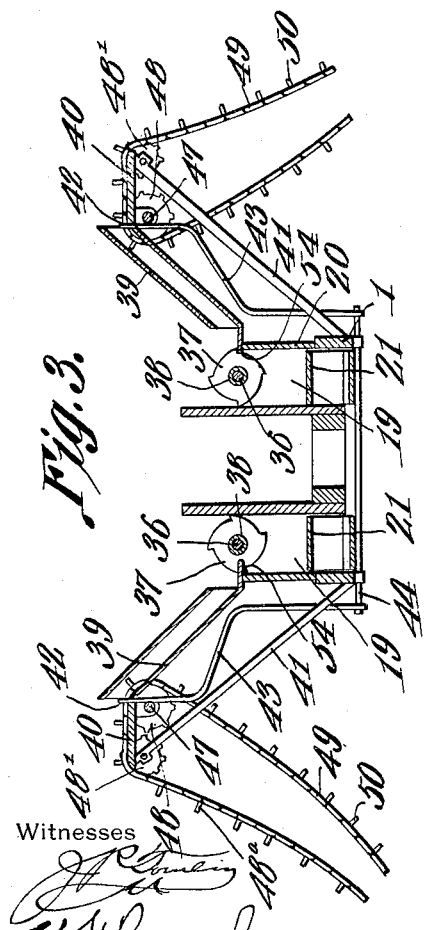
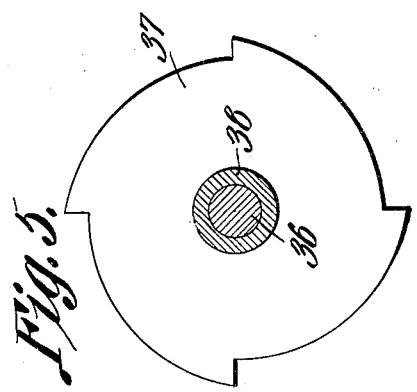
Charles Bozile,
Inventor

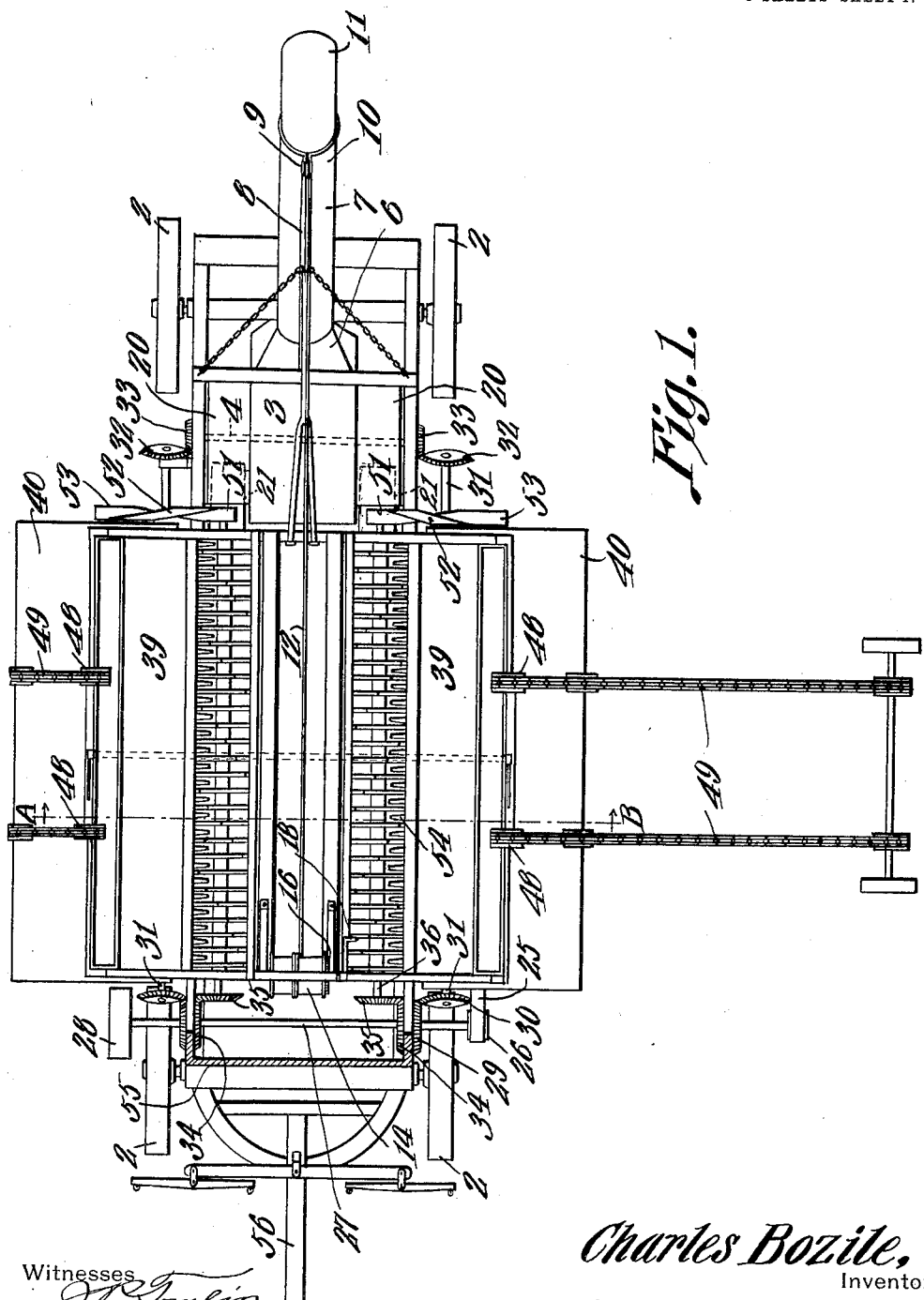

UNITED STATES PATENT OFFICE.

CHARLES BOZILE, OF MANAWA, WISCONSIN, ASSIGNOR OF ONE-HALF TO WILLIAM WICKERT, OF NEW LONDON, WISCONSIN.

ENSILAGE-CUTTER.

1,084,249.　　　Specification of Letters Patent.　　Patented Jan. 13, 1914.

Application filed August 5, 1912.　Serial No. 713,420.

*To all whom it may concern:*

Be it known that I, CHARLES BOZILE, citizen of the United States, residing at Manawa, in the county of Waupaca and State of Wisconsin, have invented certain new and useful Improvements in Ensilage-Cutters, of which the following is a specification.

This invention relates to machines for cutting ensilage and has for an object to provide improved means for reducing the ensilage to a finely comminuted state.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine, certain parts being broken away. Fig. 2 is a side elevation. Fig. 3 is a transverse section through the machine on line A—B Fig. 1. Fig. 4 is an enlarged section through the blower and its casing. Fig. 5 is an enlarged transverse section through one of the shafts of the cutting mechanism and showing the cutting disks in elevation. Fig. 6 is a transverse section through the blower and its casing.

Referring to the figures by characters of reference 1 designates a main frame having supporting wheels 2 whereby the same can be readily transported. Mounted upon this frame adjacent one end is a blower casing 3 through the center of which extends a transverse shaft 4 carrying a blower 5 which can be of any preferred construction. The casing 3 has an outlet nozzle 6 on which is mounted a stacking tube 7 and mounted on the body 1 and adjacent the tube 7 is a mast 8 carrying a sheave 9 at its upper end. A tubular stacker section 10 is slidably mounted on the tube 7 and has a curved nozzle 11 at its upper end. A cable 12 or the like is secured to the lower end of the section 10 and extends upwardly over sheave 9 and thence downwardly, under a guide sheave 13, to a drum 14 which is supported above the front end portion of the body 1 by standards 15 or the like. This drum has a ratchet wheel 16 revoluble therewith and normally engaged by a pawl 17 whereby it is held against rotation. A crank 18 is used for the purpose of winding the cable 12 upon the drum. Obviously, when the cable 12 is wound on the drum 14, the slidable section 10 will be raised and, by unwinding the connection, said section will be caused to gravitate downwardly. Thus the stacker made up of the tube 7 and the section 10 can be elongated or shortened as desired.

Both sides of the casing 3 are provided with large feed openings 19' to which lead parallel troughs 19 arranged longitudinally within the side portions of the box-like body 20 which is supported by the frame 1. Endless conveyer belts 21 are arranged in the bottom portions of these troughs and are mounted on transversely extending shafts 22 and 23 journaled in the frame 1. The shafts 22 extend inwardly from the sides of the frame 1 and at opposite sides of the blower casing 3, while the shaft 23 extends throughout the width of the frame 1 adjacent the front end of the body 20 and is adapted to rotate. A pulley 24 is secured to and rotates with shaft 23 and receives motion, through a belt 25, from a pulley 26 secured to the drive shaft 27 of the machine. This drive shaft extends transversely of the front portion of the machine and may be provided with a pulley 28 whereby motion may be transmitted thereto through a belt, not shown. Bevel gears 29 are secured to the shaft 27 and mesh with gears 30 secured to the front ends of longitudinally extending shafts 31, the rear ends of these shafts being provided with gears 32 which mesh with gears 33 secured to the ends of the shafts 4. Additional bevel gears 34 are secured to the shaft 27 and mesh with gears 35 secured to the front ends of shafts 36. These shafts extend longitudinally within the troughs 19 and above the endless belts 21 and each shaft 36 has a gang of cutting disks 37 keyed or otherwise secured thereto. Each disk has preferably four outstanding teeth and the teeth on the series of disks are arranged spirally. Spacing collars 38 are interposed between the disks.

The outer side of each trough 19 has a feed spout 39 leading downwardly thereto and extending throughout the length of the trough, the upper end of this spout or chute being adapted to receive material from a table 40 extending laterally from the machine and held in place by a suitable arrangement of braces 41. A band cutter 42 is arranged between the table 40 and the chute or spout 39 and is arranged at the upper end of an arm 43 which is keyed or otherwise secured to one end of a rock shaft 44. A pitman 45 connects one of these arms 43 to a crank arm 46 which rotates with the shaft 23.

A shaft 47 extends longitudinally under each table 40 and has a series of sprockets 48 secured thereto, these sprockets being engaged by endless chains 49 having outstanding lugs 50. Said chains also pass over idler sprockets 48'.

It will be apparent, from the foregoing description, that when shaft 27 is actuated, motion will be transmitted through gears 34 and 35 to the shafts 36 and the cutting disks 37. Pulleys 51 are secured to the rear ends of the shafts 36 and transmit motion, through belts 52, to pulleys 53 secured to the rear ends of the shafts 47. Thus, it will be seen that the shafts 47 will be rotated and the lugs 50 on chains 49 will engage the ensilage and elevate it to the table 40 where the bands with which the ensilage is tied, will be severed by the band cutters 42. Obviously these band cutters will be oscillated by the crank arm 46 transmitting motion through the pitman 45 to one of the arms 43. The material released by the cutting of the bands will gravitate downwardly through the chutes or spouts 39 into the respective troughs 19 where it will be engaged by the rapidly rotating cutting disks 37 and reduced to a finely comminuted state. The material will gravitate onto the endless belts 21 which are driven by shaft 23 and will be conveyed by these belts to opposite sides of the blower casing 3. When the material reaches the casing 3 it will be sucked thereinto by the blower 5 and thrown upwardly through the nozzle 6 and into the stacker 7—10. As the material is piled in the silo or other receptacle, the stacker can be gradually elongated in the manner hereinbefore described.

For the purpose of supporting the material while it is being acted upon by the rotating disks 37, a series of fingers 54 is arranged adjacent each gang of disks 37, these fingers projecting between the disks.

A suitable housing, such as shown at 55, may be arranged over the gears 34 and 35 so as to prevent injury to the driver. Any suitable draft gearing such as shown at 56 may be connected to the front end of the machine. The endless chains 49 can be held in the pile of material to be elevated, by any suitable means not shown. When the machine is not in use, these chains can be lifted onto the table 40 or can be carried in any other suitable manner.

What is claimed is:—

A machine for cutting ensilage, including a trough, a table extending along one side of the trough, said trough and table being coextensive in length, a chute of the same length as the trough and table for directing material downwardly from the table to the trough, cutting means within the trough, means for directing material into the chute from the table, and an endless conveyer constituting the bottom of the trough and operating to remove the contents of the trough.

In testimony whereof I affix my signature in presence of two witnesses.

CHARLES BOZILE.

Witnesses:
R. E. SCANLON,
G. D. DICK.

---

Copies of this patent may be obtained for five cents each, by addressing the "Commissioner of Patents, Washington, D. C."